United States Patent
Lakshmipathy et al.

(10) Patent No.: US 11,526,819 B1
(45) Date of Patent: Dec. 13, 2022

(54) OUT OF OFFICE MANAGEMENT

(71) Applicant: Wells Fargo Bank, N.A., San Francisco, CA (US)

(72) Inventors: Lalitha Lakshmipathy, Bangalore (IN); Tapan Totla, Bangalore (IN); Naveen Gururaja Yeri, Charlotte, NC (US); Fordjour Y. Kyei, Eden Prairie, MN (US); Janaki R. Akella, Waukee, IA (US); Narender Dhiman, Bangalore (IN); Ramamohan S, Bangalore (IN); Kevin J. Hale, Dublin, OH (US)

(73) Assignee: Wells Fargo Bank, N.A., San Francisco, CA (US)

( * ) Notice: Subject to any disclaimer, the term of this patent is extended or adjusted under 35 U.S.C. 154(b) by 141 days.

(21) Appl. No.: 16/570,705

(22) Filed: Sep. 13, 2019

(51) Int. Cl.
*G06Q 10/06* (2012.01)
*G06Q 10/10* (2012.01)

(52) U.S. Cl.
CPC . *G06Q 10/063116* (2013.01); *G06Q 10/0635* (2013.01); *G06Q 10/103* (2013.01)

(58) Field of Classification Search
CPC .. G06Q 10/00; G06Q 10/06; G06Q 10/06311; G06Q 10/105; G06Q 10/109; G06Q 10/1093; G06Q 10/063114; G06Q 10/1095; G06Q 10/063116; G06Q 10/0635; G06Q 10/103; G06F 3/48; G06F 15/0266; H04M 3/51
See application file for complete search history.

(56) References Cited

U.S. PATENT DOCUMENTS

| | | | |
|---|---|---|---|
| 6,640,230 B1 | 10/2003 | Alexander et al. | |
| 8,015,042 B2 | 9/2011 | Seetharaman et al. | |
| 8,224,472 B1 * | 7/2012 | Maluf | G06Q 10/063116 700/97 |
| 8,423,451 B1 | 4/2013 | Flaxman et al. | |
| 8,886,732 B2 | 11/2014 | Avitabile et al. | |
| 9,098,492 B2 | 8/2015 | Tunstall | |
| 9,110,882 B2 | 8/2015 | Overell et al. | |
| 9,170,993 B2 | 10/2015 | Kalia et al. | |
| 2004/0243422 A1 | 12/2004 | Weber et al. | |
| 2006/0224478 A1 | 10/2006 | Harbison et al. | |
| 2007/0299713 A1 | 12/2007 | Macbeth et al. | |

(Continued)

OTHER PUBLICATIONS

George, JF, The Multi-Dimensionality of computer-based monitoring in the workplace, Jan. 1, 1993, Proceedings of the Twenty-sixth Hawaii International Conference on System Sciences, vol. iii, pp. 609-619 (Year: 1993).*

*Primary Examiner* — Robert D Rines
(74) *Attorney, Agent, or Firm* — Kilpatrick Townsend & Stockton LLP

(57) ABSTRACT

Out of office management is provided to an institution and customers of the institution. Employee data can be monitored of one or more employees of the institution. A likelihood an employee is out of office is determined. A set of projects of the employee that are affected by the out of office is determined. The projects are analyzed to determine departure scores for each project of the set of projects. The projects are ranked according to the departure scores to determine criticality of each project. The projects are reassigned based on the employee data and the ranking. Customer sentiments are monitored after reassignment for machine learning to affect future out of office reassignments.

20 Claims, 7 Drawing Sheets

(56) References Cited

U.S. PATENT DOCUMENTS

| | | |
|---|---|---|
| 2008/0104175 A1 | 5/2008 | Keohane et al. |
| 2009/0307025 A1* | 12/2009 | Menon .................. G06Q 10/06 705/7.28 |
| 2010/0324964 A1* | 12/2010 | Callanan .......... G06Q 10/06398 705/322 |
| 2011/0119102 A1 | 5/2011 | Horn et al. |
| 2012/0311583 A1 | 12/2012 | Gruber et al. |
| 2013/0103391 A1 | 4/2013 | Millmore et al. |
| 2014/0006078 A1 | 1/2014 | McGauley et al. |
| 2014/0195445 A1 | 7/2014 | Abuelsaad et al. |
| 2014/0304018 A1* | 10/2014 | Clifford .................. G07C 1/10 705/7.15 |
| 2015/0356434 A1 | 12/2015 | Sanchez et al. |
| 2016/0085821 A1 | 3/2016 | Chadha et al. |
| 2016/0314418 A1* | 10/2016 | Varghese ........... G06Q 10/0635 |
| 2017/0116552 A1 | 4/2017 | Deodhar et al. |

\* cited by examiner

OUT OF OFFICE MANAGEMENT

BACKGROUND

Increasingly, businesses, financial institutions, and other entities lose customers and money due to employee vacations and other out of office reasons. Customers can have projects that are time sensitive which can lead to the customer moving to a competitor. Employees oftentimes have close working relationships with the customers while working on a project. A break point in the seamless communication with the employee for a specific span of time leads to customer frustration, ambiguity, and stronger market competition from competitors. Prevention of customer decisions at this point can lead to losing the customer and hence business for the institution. One of the major breakpoints identified is when the employee takes a vacation, or personal time off.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

Out of office management is provided to an institution. Employee data can be monitored of one or more employees of the institution. A likelihood an employee is out of office is determined. A set of projects of the employee that are affected by the out of office is determined. The projects are analyzed to determine departure scores for each project of the set of projects. The projects are ranked according to the departure scores to determine criticality of each project. The projects are reassigned based on the employee data and the ranking. Customer sentiments are monitored after reassignment for machine learning to affect future out of office reassignments.

In aspects, the subject innovation provides substantial benefits in terms of out of office management. One advantage resides in automatic reassignment of projects. Another advantage resides in better retention of customers while an employee is out of office.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Out of office management is provided to an institution. Employee data can be monitored of one or more employees of the institution. A likelihood an employee is out of office is determined. A set of projects of the employee that are affected by the out of office is determined. The projects are analyzed to determine departure scores for each project of the set of projects. The projects are ranked according to the departure scores to determine criticality of each project. The projects are reassigned based on the employee data and the ranking. Customer sentiments are monitored after reassignment for machine learning to affect future out of office reassignments.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to incorporate all modifications, equivalents, and alternatives falling within the spirit and scope of this specification and claims appended hereto.

Figure 1:
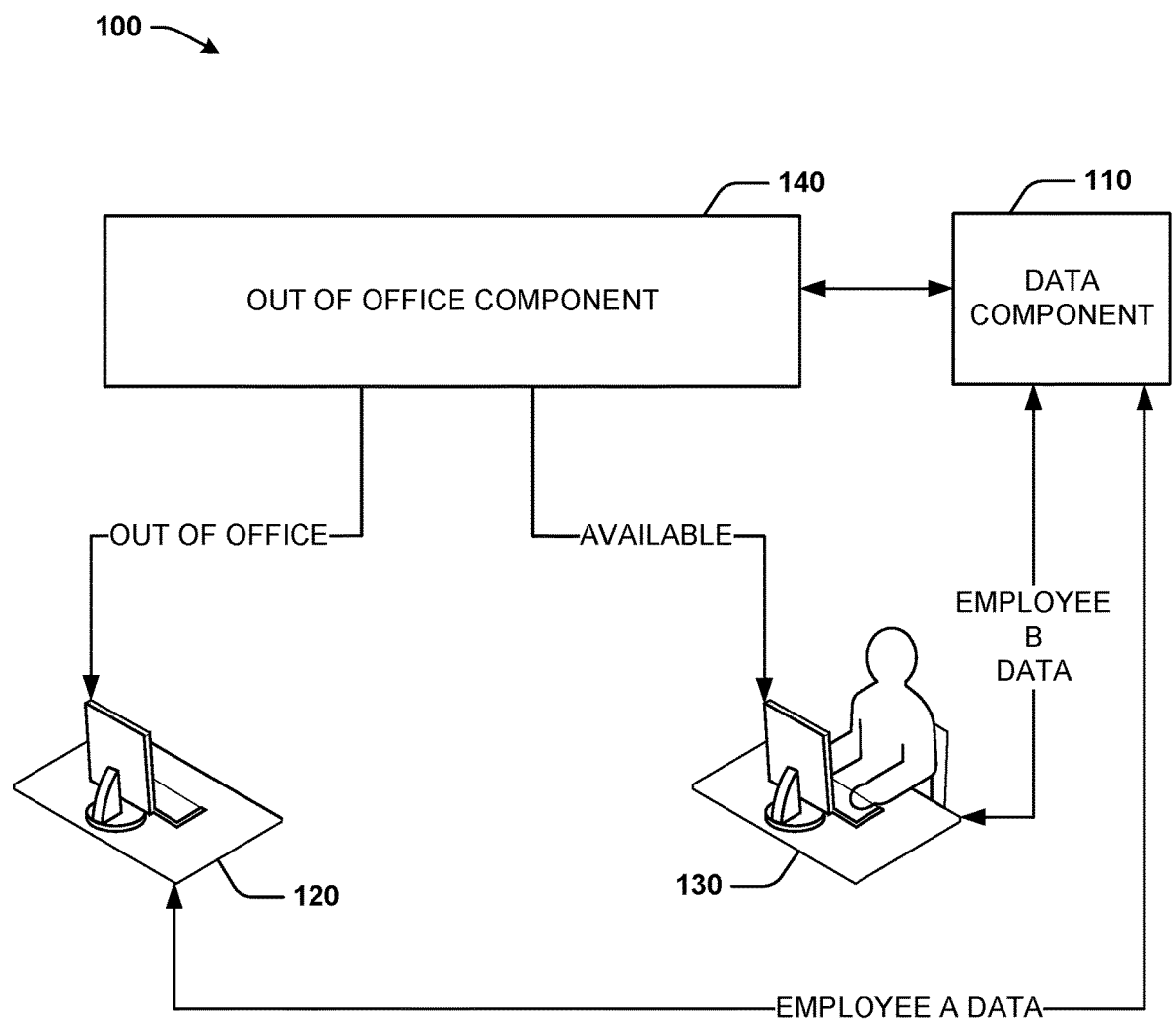
FIG. 1 illustrates an example component diagram of a system according to aspects of the present innovation.

FIG. 1 illustrates a system 100 for out of office management. The system 100 includes a data component 110. The data component 110 monitors employee data of one or more employees of an institution. The data component 110 monitors or otherwise receives employee data. For example, the data component 110 can monitor a first employee 120 and a second employee 130. For purposes of ease of explanation, the example system 100 is described using two employees. However, it is contemplated that a plurality of employees can be monitored for employee data and use with the system 100. The employee data can include at least one of employee communications data, calendar entries, time entries, social media, learned employee behavior, time off requests, and/or the like. In other aspects, contextual data (e.g., current location, current activity, etc.) can be included in the employee data for analysis within the spirit and scope of the innovation. In one example, the data component 110 can collect email correspondence about a project between an employee and a customer thereby analyzing the content therein.

The system 100 includes an out of office component 140. The out of office component 140 determines whether an employee is out of office. In some embodiments, the out of office component 140 can determine a probability or a binary determination that an employee is out of office based on the employee data. The out of office component 140 receives and stores the employee data from the data component 110.

From the monitored employee data, the out of office component 140 can determine a likelihood that an employee is out of the office. The out of office component 140 analyzes the employee data to determine a likelihood the employee is out of office. In some embodiments, the out of office component 140 factors vacation days remaining, time of the year, season, upcoming holidays, and/or the like to predict the likelihood the employee is out of office.

In some embodiments, the out of office component 140 can apply natural language processing techniques to employee communications to look for words or phrases that indicate the employee is out of office or going to be out of office. For example, an employee email can be analyzed for words such as "vacation," "holiday," and/or associated dates to factor into the likelihood the employee is or will be out of office.

In other embodiments, the out of office component 140 can apply a volume metric analysis to employee communications of the employee data to determine the likelihood. For example, a sudden downturn or absence of emails sent by an employee factors into a higher likelihood that the employee is out of office. In some embodiments, the out of office component 140 can determine an average score, weighted average score, normalized score or rating of each different employee data source to determine an overall likelihood that the employee is out of the office.

In some embodiments, the out of office component 140 can compare the determined likelihood to an out of office threshold. The out of office threshold can be a predetermined threshold percentage or score, where if the determined likelihood meets or exceeds the threshold, the out of office component determines that the employee is out of the office. In some embodiments, there are multiple thresholds that can translate to different actions or determinations. For example, meeting a lower threshold can trigger an automatic message to the employee to query whether they are out of the office.

If the out of office component 140 determines that the employee is out of the office, the out of office component 140 determines a set of projects of the employee that are affected by the out of office. The project data can be retrieved by the data component 110. The projects can be related to customer services or related to a customer of the institution. For example, the institution can be a financial institution and the customer can be working with an employee towards a home loan. The home loan would be the project associated with the employee that is determined by the out of office component 140. In some embodiments, the out of office component 140 can determine projects using the analysis of employee communications and/or other employee data such as case numbers, files, and/or the like.

The out of office component 140 analyzes the projects to determine a priority for each project of the set of projects. In some embodiments, the priority is determined by a departure score. The out of office component 140 determines a departure score for at least one project in the set of projects. The departure score represents the risk that a project may leave the institution if not attended to while the employee is out of office.

The out of office component 140 determines project information of a project or set of projects. The project information can include at least one of customer information, customer status (e.g. new vs. existing), customer communications, stage of the project, urgency of project, loan risk, customer sentiment, complaints data, historical departure score of employee, historical departure rate of employee, historical success rate of employee, tenure of employee, compliance data, competitor comparison, and/or the like. The project information is used to determine the departure score of the project to facilitate determining a priority of projects while the employee is out of office.

In some embodiments, each piece of project information can be assigned a score and the scores can be aggregated into an overall departure score. The overall departure score can be an average, weighted average, total, and/or the like. In other embodiments, the out of office component 140 uses and/or develops a model to determine the departure score. The model can include determined variables or constants for each type of project information to determine the departure score.

In some embodiments, the out of office component 140 compares the departure score to a threshold departure score. The threshold departure score can be predetermined, machine learned, and/or the like. In other embodiments, the out of office component 140 compares the departure score to multiple threshold departure scores to determine a priority of the project. In some embodiments, the out of office component 140 ranks multiple projects by departure score to determine a priority. In other embodiments, the out of office component 140 ranks the projects that meet the threshold departure score.

The out of office component 140 can reassign the projects based on the analysis and the priority. The out of office component 140 can identify one or more employees that are in office using analyzed employee data from the data component 110. The out of office component 140 use factors in employee data of candidate employees to reassign a project to. The factors can include availability, presence within same division and/or location, historical performance, existing workload, attributes, historical departure score, timeliness in resolutions, and/or the like. The out of office component 140 can distribute the one or more projects that are prioritized to the one or more employees in office.

In some embodiments, the out of office component 140 can determine an optimal employee to assign the projects. For example, the out of office component 140 can use prediction models for distribution of projects to an optimal employee. In other embodiments, the out of office component 140 uses advanced machine learning techniques to previous projects and other data to cluster prioritized customers or projects.

In some embodiments, the out of office component 140 can generate a notification or assignment message to the reassigned employee. The assignment message can include automatically generated highlights of the project history based on analysis of the monitored employee information. In some embodiments, the assignment message can include complaints information.

In some embodiments, the data component 110 can monitor a customer sentiment of a reassigned project. For example, the data component 110 can monitor communications with a customer of a reassigned project to determine whether the customer is satisfied with the project progress and/or completion. The monitored data can be used with machine learning concepts to affect selection of employees to distribute future reassigned projects.

Figure 2:
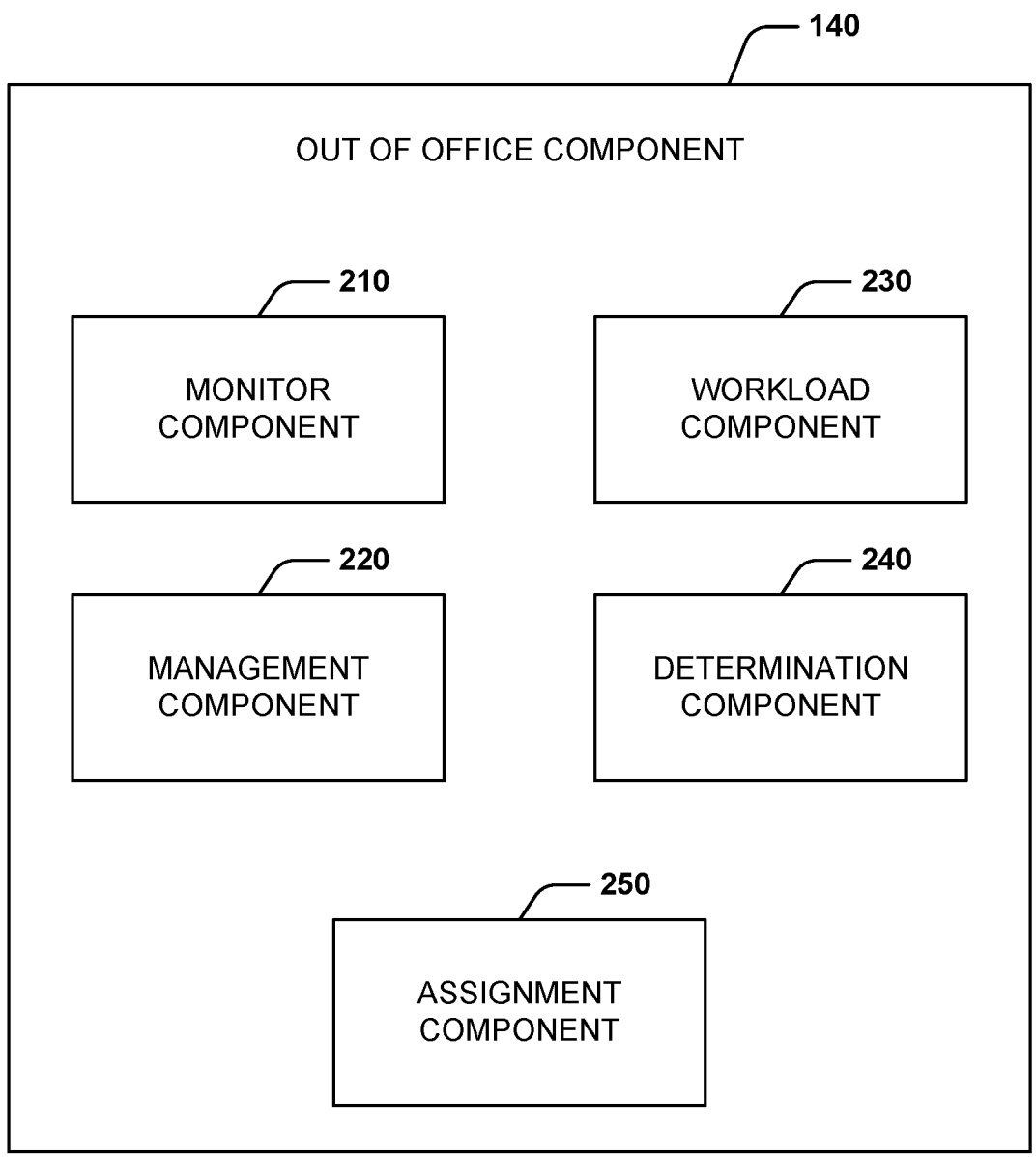
FIG. 2 illustrates an example component diagram of an out of office component.

FIG. 2 illustrates an example component diagram of an out of office component 140. The out of office component 140 includes a monitor component 210. The monitor component 210 monitors employee data of one or more employees of an institution. The employee data can include at least one of employee communications data, calendar entries, time entries, social media, learned employee behavior, time off requests, and/or the like. For example, the monitor component 210 can collect email correspondence about a project between an employee and a customer.

The out of office component 140 includes a management component 220. The management component 220 determines whether an employee is out of office. The management component 220 receives and stores the employee data from the monitor component 210. From the monitored employee data, the management component 220 can determine a likelihood that an employee is out of the office. The management component 220 analyzes the employee data to determine a likelihood the employee is out of office. In some embodiments, the management component 220 uses vacation days remaining, time of the year, season, upcoming holidays, and/or the like to predict the likelihood the employee is out of office.

In some embodiments, the management component 220 can apply natural language processing techniques to employee communications to look for words or phrases that indicate the employee is out of office or going to be out of office. For example, an employee email can be analyzed for words such as "vacation," "holiday," and/or associated dates to factor into the likelihood the employee is or will be out of office.

In other embodiments, the management component 220 can apply a volume metric analysis to employee communications of the employee data to determine the likelihood. For example, a sudden downturn or absence of emails sent by an employee factors into a higher likelihood that the employee is out of office. In some embodiments, the management component 220 can determine an average score, weighted average score, normalized score or rating of each different employee data source to determine an overall likelihood that the employee is out of the office.

In some embodiments, the management component 220 can compare the determined likelihood to an out of office threshold. The out of office threshold can be a predetermined threshold percentage or score, where if the determined likelihood meets or exceeds the threshold, the management component determines that the employee is out of the office. In some embodiments, there are multiple thresholds that can translate to different actions or determinations. For example, meeting a lower threshold can trigger an automatic message to the employee to query whether they are out of the office.

The out of office component 140 includes a workload component 230. If the management component 220 determines that the employee is out of the office, the workload component 230 determines a set of projects of the employee that are affected by the out of office. The projects are related to customer services related to a customer of the institution. For example, the institution can be a financial institution and the customer can be working with an employee towards a home loan. The home loan would be the project associated with the employee that is determined by the workload component 230. In some embodiments, the workload component 230 can determine projects using the analysis of employee communications and/or other employee data such as case numbers, files, and/or the like.

The out of office component 140 includes a determination component 240. The determination component 240 analyzes the projects to determine a priority for each project of the set of projects. In some embodiments, the priority is determined by a departure score. The determination component 240 determines a departure score for at least one project in the set of projects. The departure score represents the risk that a project may leave the institution if not attended to while the employee is out of office.

The determination component 240 determines project information of a project or set of projects. The project information can include at least one of customer information, customer status (e.g. new vs. existing), customer communications, stage of the project, urgency of project, loan risk, customer sentiment, complaints data, historical departure score of employee, historical departure rate of employee, historical success rate of employee, tenure of employee, compliance data, competitor comparison, and/or the like. The project information is used to determine the departure score of the project to facilitate determining a priority of projects while the employee is out of office.

In some embodiments, each piece of project information can be assigned a score and the scores can be aggregated into an overall departure score. The overall departure score can be an average, weighted average, total, and/or the like. In other embodiments, the determination component 240 uses and/or develops a model to determine the departure score. The model can include determined variables or constants for each type of project information to determine the departure score.

In some embodiments, the determination component 240 compares the departure score to a threshold departure score. The threshold departure score can be predetermined, machine learned, and/or the like. In other embodiments, the determination component 240 compares the departure score to multiple threshold departure scores to determine a priority of the project. In some embodiments, the determination component 240 ranks multiple projects by departure score to determine a priority. In other embodiments, the determination component 240 ranks the projects that meet the threshold departure score.

The out of office component 140 includes an assignment component 250. The assignment component 250 reassigns the projects based on the analysis and the priority. The assignment component 250 and/or the management component 220 can identify one or more employees that are in office using analyzed employee data from the management component 220. The assignment component 250 use factors in employee data of candidate employees to reassign a project to. The factors can include availability, presence within same division and/or location, historical performance, existing workload, attributes, historical departure score, timeliness in resolutions, and/or the like. The assignment component 250 can distribute the one or more projects that are prioritized to the one or more employees in office.

In some embodiments, the assignment component 250 can determine an optimal employee to assign the projects. For example, the assignment component 250 can use prediction models for distribution of projects to an optimal employee. In other embodiments, the assignment component 250 uses advanced machine learning techniques to previous projects to cluster prioritized customers or projects.

In some embodiments, the assignment component 250 can generate a notification or assignment message to the reassigned employee. The assignment message can include automatically generated highlights of the project history based on analysis of the monitored employee information. In some embodiments, the assignment message can include complaints information.

In some embodiments, the monitor component 210 can monitor a customer sentiment of a reassigned project. For example, the monitor component 210 can monitor communications with a customer of a reassigned project to determine whether the customer is satisfied with the project progress and/or completion. The monitored data can be used with machine learning concepts to affect selection of employees to distribute future reassigned projects.

Figure 3:
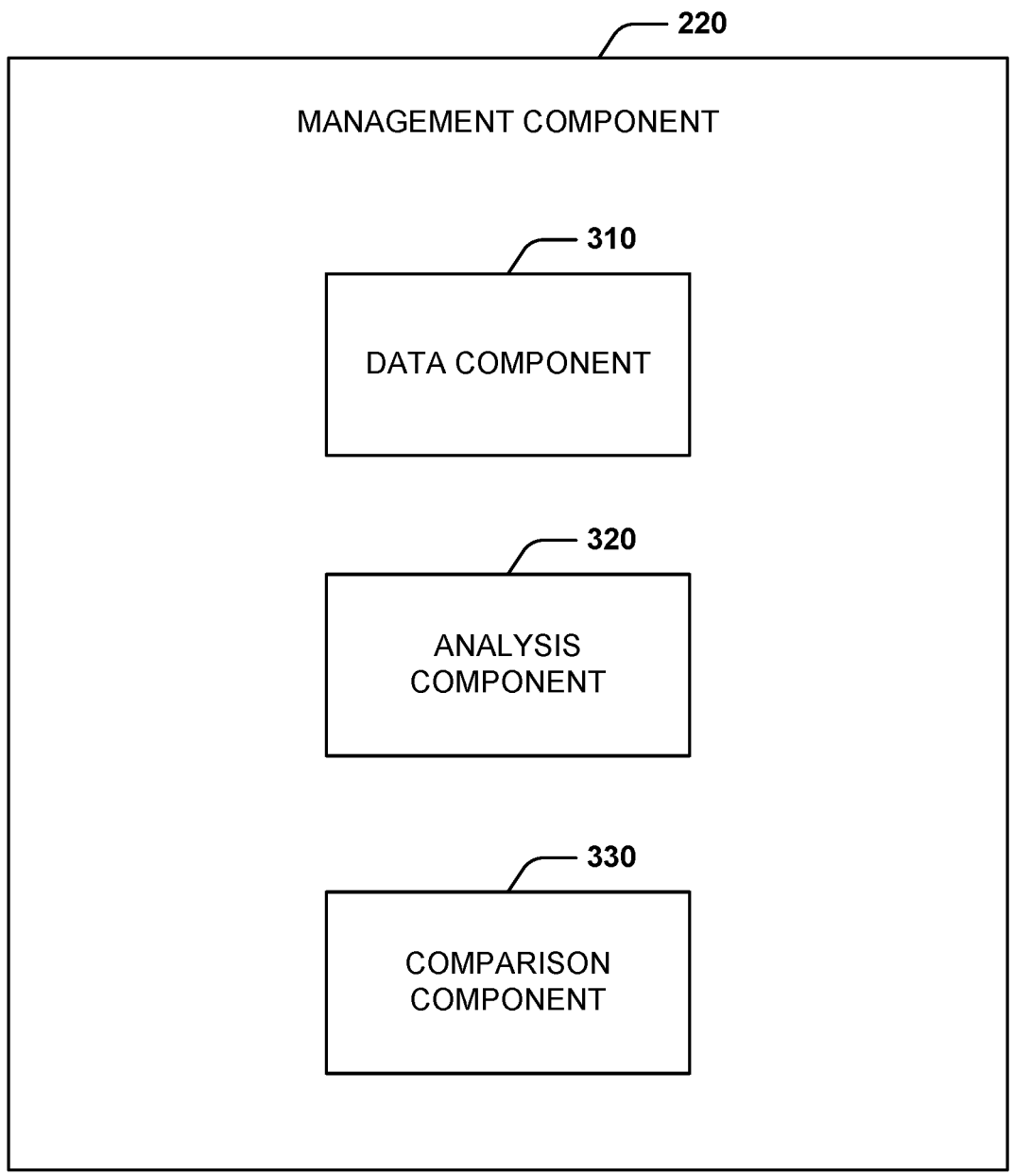
FIG. 3 illustrates an example component diagram of management component.

FIG. 3 illustrates a detailed component diagram of the management component 220. The management component 220 includes a data component 310. The data component 310 receives and stores the employee data from the monitor component 210. The management component 220 includes an analysis component 320. From the monitored employee data, the analysis component 320 can determine a likelihood that an employee is out of the office. The analysis component 320 analyzes the employee data to determine a likelihood the employee is out of office.

In some embodiments, the analysis component 320 can apply natural language processing techniques to employee communications to look for words or phrases indicating the employee is out of office or going to be out of office. For example, an employee email can be analyzed for words such as "vacation," "holiday," and/or associated dates to factor into the likelihood the employee is or will be out of office.

In other embodiments, the analysis component 320 can apply a volume metric analysis to employee communications of the employee data to determine the likelihood. For example, a sudden downturn or absence of emails sent by an employee factors into a higher likelihood that the employee is out of office. In some embodiments, the analysis component 320 can determine an average score, weighted average score, normalized score or rating of each different employee data source to determine an overall likelihood that the employee is out of the office.

In some embodiments, the management component 220 includes a comparison component 330. The comparison component 330 can compare the determined likelihood to an out of office threshold. The out of office threshold can be a predetermined threshold percentage or score, where if the determined likelihood meets or exceeds the threshold, the management component 220 determines that the employee is out of the office. In some embodiments, there are multiple thresholds that can translate to different actions or determinations. For example, meeting a lower threshold can trigger an automatic message to the employee to query whether they are out of the office.

Figure 4:
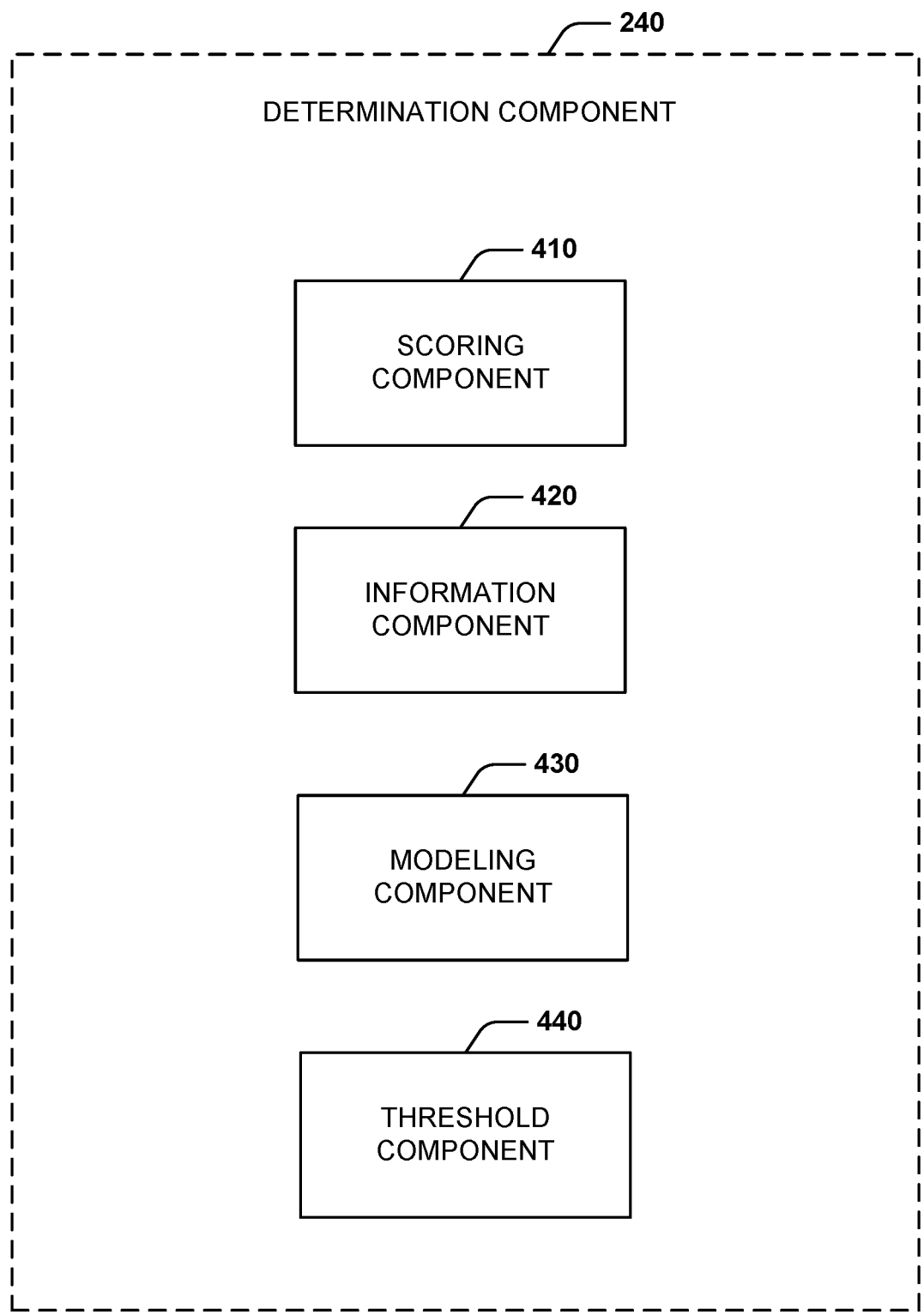
FIG. 4 illustrates an example component diagram of a determination component.

FIG. 4 illustrates a component diagram of the determination component 240. The determination component 240 analyzes the projects to determine a priority for each project of the set of projects. In some embodiments, the priority is determined by a departure score. The determination component 240 includes a scoring component 410. The scoring component 410 determines a departure score for at least one project in the set of projects. The departure score represents the risk that a project may leave the institution if not attended to while the employee is out of office.

The determination component 240 includes an information component 420. The information component 420 determines project information of a project or set of projects. The project information can include at least one of customer information, customer communications, stage of the project, customer sentiment, complaints data, and/or the like. The project information is used to determine the departure score of the project to facilitate determining a priority of projects while the employee is out of office.

In some embodiments, the scoring component 410 assigns each piece of project information a score and aggregates the scores into an overall departure score. The overall departure score can be an average, weighted average, total, and/or the like. In other embodiments, the determination component 240 can include a modeling component 430. The modeling component 430 uses and/or develops a model to determine the departure score. The model can include determined variables or constants for each type of project information to determine the departure score.

The determination component 240 includes a threshold component 440. The threshold component 440 compares the departure score to a threshold departure score. The threshold departure score can be predetermined, machine learned, and/or the like. In other embodiments, the threshold component 440 compares the departure score to multiple threshold departure scores to determine a priority of the project. In some embodiments, the scoring component 410 ranks multiple projects by departure score to determine a priority. In other embodiments, the scoring component 410 ranks the projects that meet the threshold departure score.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but appreciated by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers. . .). Among other things, such components can automate certain mechanisms or processes performed thereby to make portions of the systems and methods more adaptive as well as efficient and intelligent. By way of example, and not limitation, such mechanisms can be utilized by the out of office component 140 for out of office management.

Figure 5:
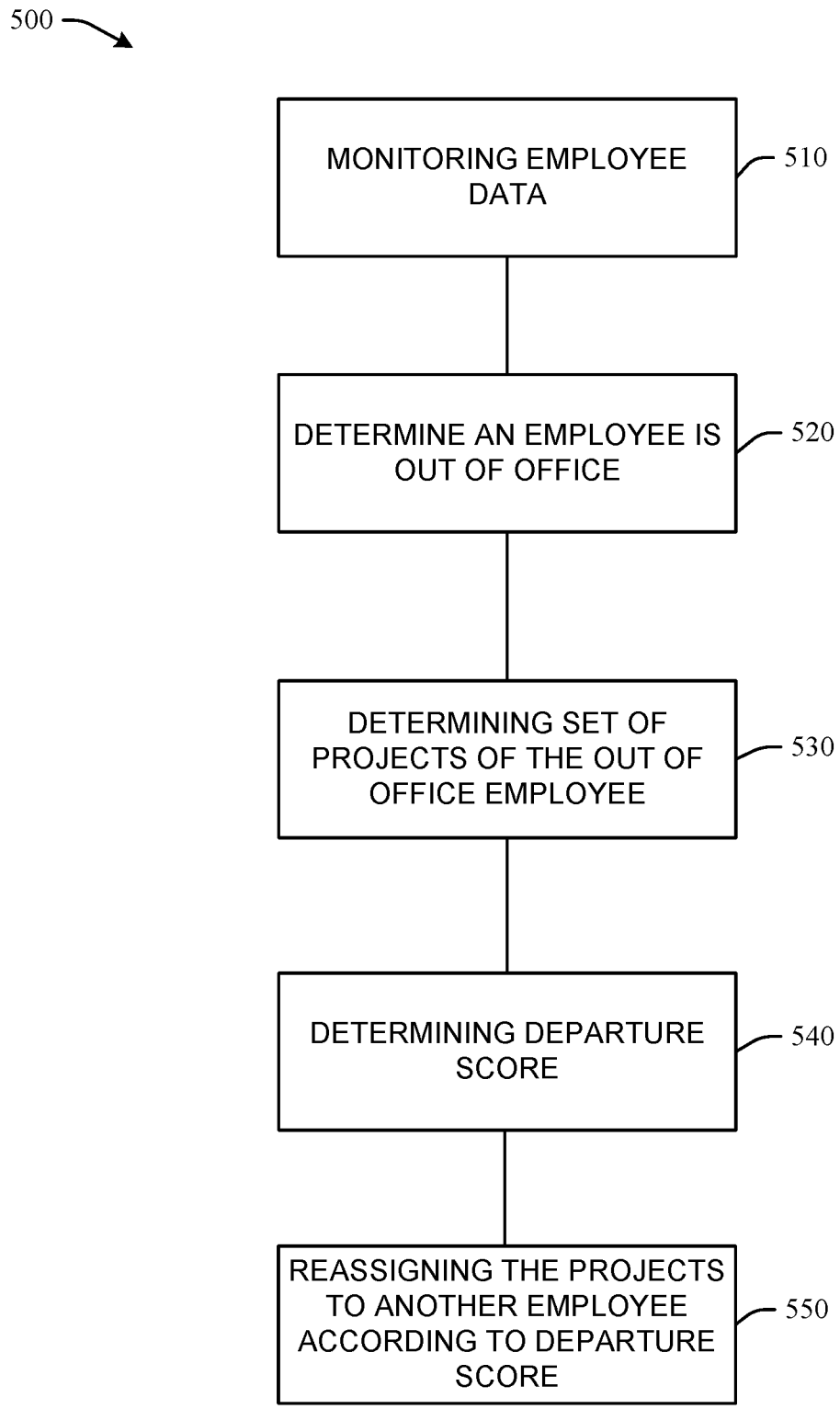
FIG. 5 illustrates an example method for out of office management.
Figure 6:
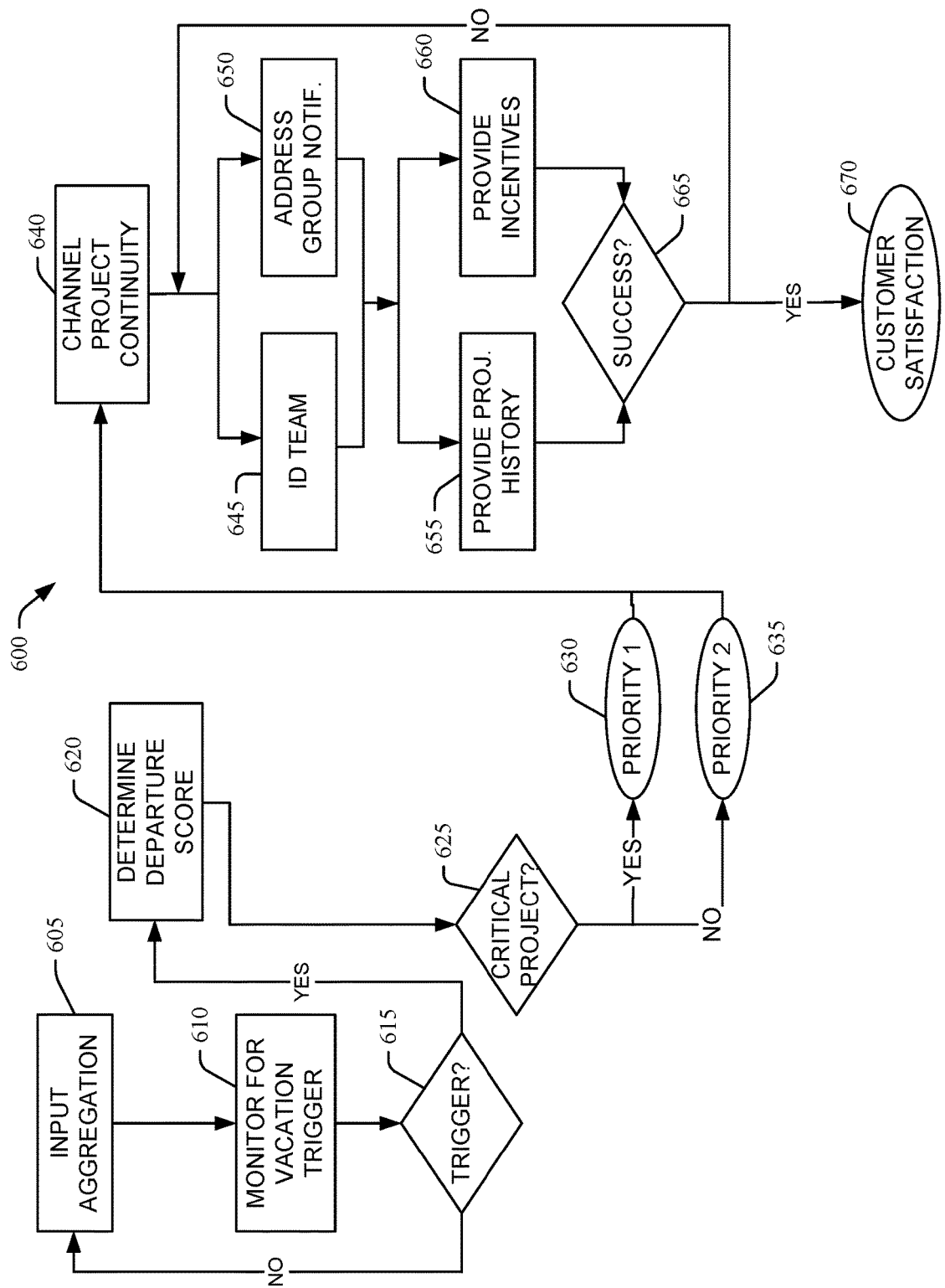
FIG. 6 illustrates an example method for out of office management.

In view of the example systems described above, methods that may be implemented in accordance with the disclosed subject matter will be better appreciated with reference to flow chart diagram of FIGS. 5 and 6. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 5 illustrates a method 500 for out of office management. At 510, employee data is monitored. The employee data can be communications data, vacation requests, employee calendars, and/or the like. The employee data can be collected by a data component 110. At 520, a determination that an employee is out of office is made. The determination is based on an analysis of the monitored employee data. An out of office component 140 can analyze the employee data received from the data component 110. At 530, a set of projects of the out of office employee is determined. The set of projects can be all projects determined to be affected by the period the employee is out of office or all projects associated with the employee. A workload component 230 can analyze employee data and determine affected projects.

At 540, a departure score is determined for the set of projects. A determination component 240 can determine the departure score. The departure score represents the likelihood that a customer associated with a particular project in the set of projects may remove the project from the institution. For example, a home loan project with a due date falling during an assigned employee's out of office period can translate to a high departure score as the likelihood the home loan project goes to a competitor is high if not handled on time. At 550, projects are reassigned to another employee(s) according to the departure score. An assignment component 250 can reassign the projects. In the example, the high departure score for the home loan leads to the home loan being reassigned to a different employee at the same financial institution to keep the customer from moving the home loan to a competitor.

FIG. 6 illustrates a method 600 for out of office management. At 605, data is aggregated about employees and/or projects. For example, employee data can be aggregated such as emails, texts, activity volume delta, computer data, vacation requests, expected holidays, birthdays, machine learned probable vacation times, and/or the like. A data component 110 can aggregate the data. At 610, the employee data is monitored for vacation triggers. In some embodiments, an out of office component 140 can utilize natural language processing and/or text analysis in email monitoring models. In other embodiments, the out of office component 140 can utilize attribution analysis to assign weights to certain events that could lead to an out of office determination. The out of office component 140 can predict the probability of out of office for an employee based on used/unused vacation days, time of year, season, position of employee within the institution, holidays, employee birthday/anniversary, and/or the like. In some embodiments, the out of office component 140 can use regular expressions to detect an out of office subject line. In other embodiments, the out of office component 140 can utilize a logistic regression model using a specific phrase search in emails or other communications. At 615, a determination of whether a vacation or out of office trigger is detected. If no trigger is detected, the method 600 returns to 605 to continue data aggregation and 610 to monitor for triggers. In some embodiments, the out of office component 140 can predict when an employee will be out of office in the future and trigger actions based on the prediction.

If a trigger is detected, at 620, a departure score is determined for projects of the out of office employee or team member. A determination component 240 can determine the departure score. The departure score represents the likelihood that a customer associated with a particular project may remove the project from the institution. For example, a home loan project with a due date falling during an assigned employee's out of office period can translate to a high departure score as the likelihood the home loan project goes to a competitor is high if not handled on time. In some embodiments, the determination component 240 can create modeling features such as stage of the project/loan, project/loan risk, employee current status, and/or the like. In some embodiments, the determination component 240 can identify urgency of a project using natural language processing and/or text analysis with customer conversation references to time or other institutions. In some embodiments, the determination component 240 can determine customer sentiments from the analysis to factor into the departure score. In some embodiments, the determination component 240 can use complaints data and machine learning to factor into the departure score.

In some embodiments, the departure score is calculated based on a two-step modeling process. An unstructured process may be followed by a structured process. The output of these two processes combined would determine the probability of departure which will be further translated into a departure score with a specified range. The unstructured information may include but not limited to: historical departure score, email/text conversation with customer, customer sentiment analysis, loan urgency, other bank comparisons, and/or the like. The structure information may include customer attributes such as new vs. existing customer, other products associated with the institution, loan value associated with the customer, and/or the like. The structured information may include loan attributes such as type of loan, loan value, loan urgency, stage of loan, and/or the like. The structured information may include property attributes such as property value, location, and/or the like. The structured information may include team member attributes such as historical success rate, loans closed vs. loans lost, tenure/experience, complaints against, non-compliance factors, incentives, and/or the like. A modeling technique uses the unstructured information and structured information to refine the departure score. The modeling techniques may include text analysis and classification techniques such as Ngrams, Adaboost, sentiment analysis, SVM, NB, deep learning, AI, and/or the like.

At 625, a determination is made of the criticality of each affected project. The determination can be made by a determination component 240 based on the departure score. If the project, e.g. a loan, is determined to be critical, e.g. has a high departure score, the project is given a high priority status at 630. If the project is determined to be less critical, e.g. has a lower departure score, the project is given a low priority status at 635. The priority status affects how the projects are assigned or reassigned because of the out of office employee to best keep the projects from being taken away by the customer.

At 640, project continuity is channeled, e.g. an optimal project redistribution is initiated. A high priority project may be determined to need to be reassigned so that the project is retained with the institution. An assignment component 250 may determine the redistribution. In some embodiments, the assignment component 250 uses advanced machine learning techniques to cluster prioritized projects and/or customers. In some embodiments, based on the departure score, high priority projects are prioritized and redistributed in two ways: rerouting the project to a group of team members in the same division/location and are in office as the out of office employee or a different group that can handle the same project.

At 645, a team member is identified for redistribution. The assignment component 240 can identify employees or team members that are not out of office, e.g. "are in office". In some embodiments, the assignment component 240 can use prediction models, optimization models, and/or the like for redistribution of projects/loans to the most optimal or appropriate team member. The assignment component 140 can utilize team member factors such as availability (in office or workload), presence within same division/location, historical performance, team member attributes (described above), departure score based on loans handled, timeliness in resolution, and/or the like.

At 650, a group notification can be generated and addressed. The group notification may optionally be in addition to or in replace of identifying the team member at 645. The group notification can include the out of office employee, an in-office employee, and/or an entire team. For example, a loan team may be addressed for the notification. The notification can include highlights or details of the high priority project to be redistributed to the team or individual team member. In some embodiments, the assignment component 250 can use text analysis to provide the information for the notification. In some embodiments, the group notification can addressed to selected team members, the selection is based on team member availability, use of loan attributes, customer attributes, email history, and/or the like.

At 655, a project history is provided to the team and/or the individual team member. The project history can include customer correspondence with the out of office employee, customer complaints history, and/or other project historical data. At 660, incentives may be provided to the team and/or individual team member. The incentives may optionally be in addition to or in replace of providing the project history at 655. The incentives provided may be bonuses, shared commission, extra vacation days, and/or the like to reward a team member that completes a high prioritized project that is retained by the institution.

At 665, a determination is made whether the high prioritized project is transitioned successfully to another team member. If the project was not successfully transitioned, the method 600 can iterate back to 645/655 to find another team member to transition the project to. If the project is transitioned successfully, at 670, customer sentiment and urgency of the project is monitored through completion of the project. The data component 110 can monitor communications between the in-office team member and the customer to determine sentiment of the customer. In some embodiments, text handlers may be used to identify return date of the out of office employee and send customized replies to customers using context if project is transitioned back to the out of office employee. In other embodiments, a loan conversion ration comparison is determined for before and after a redistribution of a project. In some embodiments, a distributed ledger, e.g. blockchain and/or the like, may be used to store project transitions between employees.

The innovation disclosed and claimed herein, in one aspect thereof, comprises systems and methods of out of office management. The management can include monitoring employee data of one or more employees of an institution. An employee is determined to be out of office. A set of projects of the employee that are affected by the out of office is determined. The projects are related to customer services a customer of the institution. The projects are analyzed to determine a priority for each project of the set of projects. The projects are reassigned based on the analysis and the priority.

A system of the innovation can include a monitor component that monitors employee data of one or more employees of an institution. An management component determines an employee is out of office. A workload component determines a set of projects of the employee that are affected by the out of office, wherein the projects are related to customer services a customer of the institution. A determination component analyzes the projects to determine a priority for each project of the set of projects. An assignment component reassigns the projects based on the analysis and the priority.

A computer readable medium has instructions to control one or more processors. The instructions can include monitoring employee data of one or more employees of an institution. The instructions can include determining a likelihood an employee is out of office and comparing the likelihood to a threshold to determine the employee is out of office. The instructions can include determining a set of projects of the employee that are affected by the out of office, wherein the projects are related to customer services a customer of the institution. The instructions can include analyzing the projects to determine departure scores for each project of the set of projects. The instructions can include ranking each project according to the departure scores. The instructions can include reassigning the projects based on the employee data and the ranking.

As used herein, the terms "component" and "system," as well as various forms thereof (e.g., components, systems, sub-systems. . .) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A ' employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
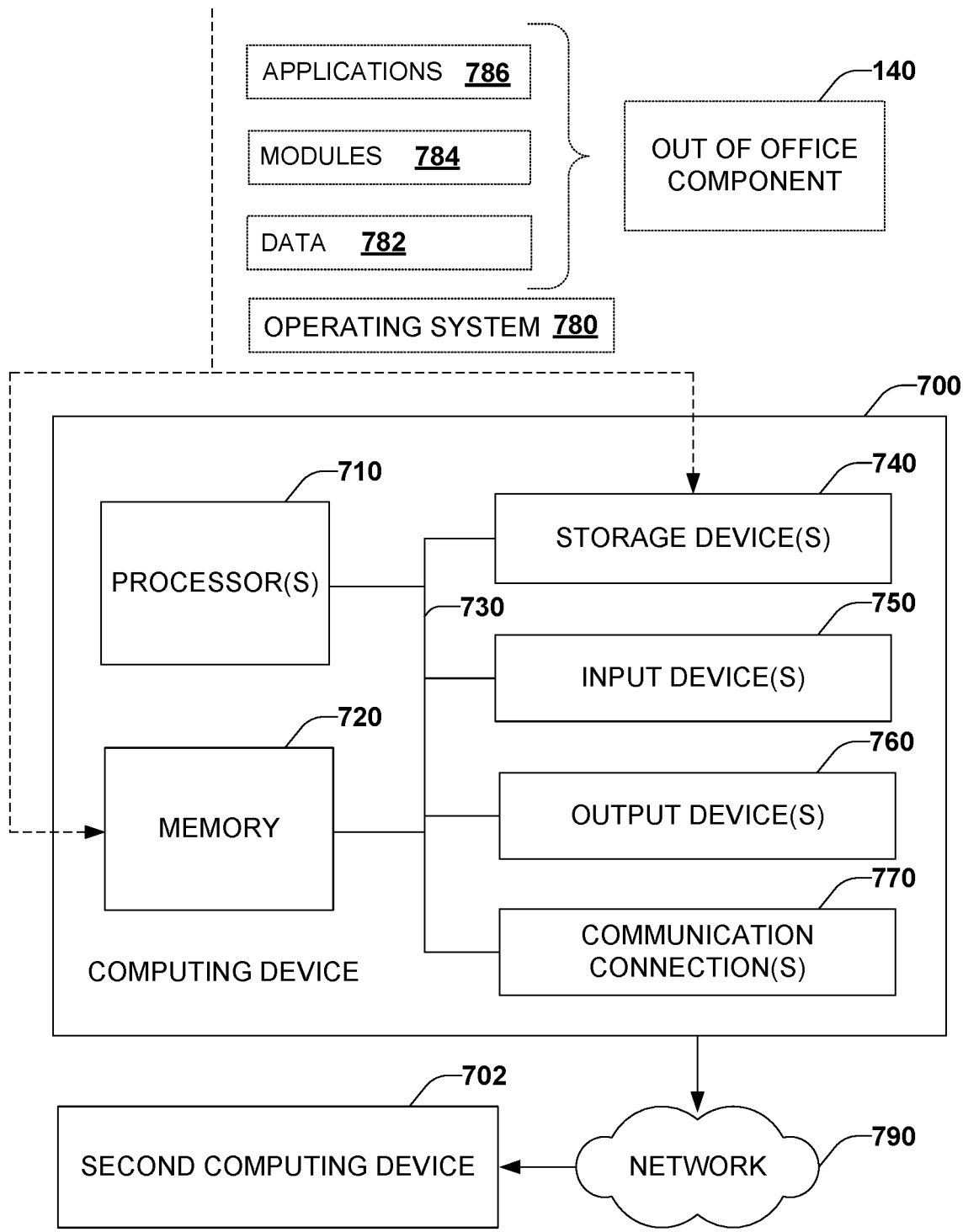
FIG. 7 illustrates a computing environment where one or more of the provisions set forth herein can be implemented, according to some embodiments.

To provide a context for the disclosed subject matter, FIG. 7 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch. . .), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 7, illustrated is an example computing device 700 (e.g., desktop, laptop, tablet, watch, server, hand-held, programmable consumer or industrial electronics, set-top box, game system, compute node. . .). The computing device 700 includes one or more processor(s) 710, memory 720, system bus 730, storage device(s) 740, input device(s) 750, output device(s) 760, and communications connection(s) 770. The system bus 730 communicatively couples at least the above system constituents. However, the computing device 700, in its simplest form, can include one or more processors 710 coupled to memory 720, wherein the one or more processors 710 execute various computer executable actions, instructions, and or components stored in the memory 720.

The processor(s) 710 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 710 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 710 can be a graphics processor unit (GPU) that performs calculations with respect to digital image processing and computer graphics.

The computing device 700 can include or otherwise interact with a variety of computer-readable media to facilitate control of the computing device to implement one or more aspects of the disclosed subject matter. The computer-readable media can be any available media that accessible to the computing device 700 and includes volatile and nonvolatile media, and removable and non-removable media. Computer-readable media can comprise two distinct and mutually exclusive types, namely storage media and communication media.

Storage media includes volatile and nonvolatile, removable, and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM). . .), magnetic storage devices (e.g., hard disk, floppy disk, cassettes, tape. . .), optical disks (e.g., compact disk (CD), digital versatile disk (DVD). . .), and solid state devices (e.g., solid state drive (SSD), flash memory drive (e.g., card, stick, key drive. . .). . .), or any other like mediums that store, as opposed to transmit or communicate, the desired information accessible by the computing device 700. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 720 and storage device(s) 740 are examples of computer-readable storage media. Depending on the configuration and type of computing device, the memory 720 may be volatile (e.g., random access memory (RAM)), non-volatile (e.g., read only memory (ROM), flash memory. . .) or some combination of the two. By way of example, the basic input/output system (BIOS), including basic routines to transfer information between elements within the computing device 700, such as during start-up, can be stored in nonvolatile memory, while volatile memory can act as external cache memory to facilitate processing by the processor(s) 710, among other things.

The storage device(s) 740 include removable/non-removable, volatile/non-volatile storage media for storage of vast amounts of data relative to the memory 720. For example, storage device(s) 740 include, but are not limited to, one or more devices such as a magnetic or optical disk drive, floppy disk drive, flash memory, solid-state drive, or memory stick.

Memory 720 and storage device(s) 740 can include, or have stored therein, operating system 780, one or more applications 786, one or more program modules 784, and data 782. The operating system 780 acts to control and allocate resources of the computing device 700. Applications 786 include one or both of system and application software and can exploit management of resources by the operating system 780 through program modules 784 and data 782 stored in the memory 720 and/or storage device(s) 740 to perform one or more actions. Accordingly, applications 786 can turn a general-purpose computer 700 into a specialized machine in accordance with the logic provided thereby.

All or portions of the disclosed subject matter can be implemented using standard programming and/or engineering techniques to produce software, firmware, hardware, or any combination thereof to control the computing device 700 to realize the disclosed functionality. By way of example and not limitation, all or portions of the out of office component 140 can be, or form part of, the application 786, and include one or more modules 784 and data 782 stored in memory and/or storage device(s) 740 whose functionality can be realized when executed by one or more processor(s) 710.

In accordance with one particular embodiment, the processor(s) 710 can correspond to a system on a chip (SOC) or like architecture including, or in other words integrating, both hardware and software on a single integrated circuit substrate. Here, the processor(s) 710 can include one or more processors as well as memory at least similar to the processor(s) 710 and memory 720, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the out of office component 140 and/or functionality associated therewith can be embedded within hardware in a SOC architecture.

The input device(s) 750 and output device(s) 760 can be communicatively coupled to the computing device 700. By way of example, the input device(s) 750 can include a pointing device (e.g., mouse, trackball, stylus, pen, touch pad. . .), keyboard, joystick, microphone, voice user interface system, camera, motion sensor, and a global positioning satellite (GPS) receiver and transmitter, among other things. The output device(s) 760, by way of example, can correspond to a display device (e.g., liquid crystal display (LCD), light emitting diode (LED), plasma, organic light-emitting diode display (OLED). . .), speakers, voice user interface system, printer, and vibration motor, among other things. The input device(s) 750 and output device(s) 760 can be connected to the computing device 700 by way of wired connection (e.g., bus), wireless connection (e.g., Wi-Fi, Bluetooth. . .), or a combination thereof.

The computing device 700 can also include communication connection(s) 770 to enable communication with at least a second computing device 702 by means of a network 790. The communication connection(s) 770 can include wired or wireless communication mechanisms to support network communication. The network 790 can correspond to a local area network (LAN) or a wide area network (WAN) such as the Internet. The second computing device 702 can be another processor-based device with which the computing device 700 can interact. For example, the computing device 700 can correspond to a server that executes functionality of out of office component 140, and the second computing device 702 can be a user device that communications and interacts with the computing device 700.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, comprising:
    monitoring, by a processor, employee data of one or more employees of an institution;
    determining, by the processor, a likelihood that an employee is out of office based upon analyzing the employee data;
    determining, by the processor, a set of projects of the employee that are affected by the out of office, wherein the set of projects are related to customer services of the institution;
    analyzing, by the processor, the set of projects to determine a priority for each project of the set of projects, wherein determining the priority comprises:
    developing, by the processor, a model based in part on a historical departure score, text analysis of customer correspondence, and customer attributes;
    determining, by the processor, a departure score using the model for at least one project in the set of projects, the departure score representing a risk a project may leave the institution; and
    detecting, by the processor, the departure scores of a subset of projects in the set of projects exceeds a threshold departure score;
    reassigning, by the processor, the subset of projects in the set of projects based on the detection, the text analysis, and the priority;
    determining, by the processor, after reassigning the subset of projects, a second departure score based on the model and updated text analysis of customer correspondence;
    detecting, by the processor, the second departure scores of the subset of projects in the set of projects exceeds a threshold departure score;
    and reassigning, by the processor, the subset of projects in the set of projects based on the detection, the updated text analysis, and the priority.

2. The method of claim 1, wherein determining an employee is out of office, comprises: comparing the likelihood to an out of office threshold.

3. The method of claim 2, wherein the employee data includes at least one of employee communications data, calendar entries, time entries, social media, learned employee behavior, contextual data or time off requests.

4. The method of claim 3, the analyzing the employee data comprising: applying natural language processing and volume metric analysis to employee communications data of the employee data to determine the likelihood.

5. The method of claim 1, wherein determining the departure score comprises:
    determining the project information the project information including at least one of customer information, customer communications, stage of the project, customer sentiment, or complaints data.

6. The method of claim 5, further comprising: modeling the project information to determine the departure score using the model.

7. The method of claim 1, wherein the reassigning comprises:
    identifying one or more employees that are in office using analyzed employee data; and distributing the one or more projects that are above a priority threshold to the one or more employees in office.

8. The method of claim 7, further comprising: monitoring customer sentiment of a reassigned project.

9. The method of claim 1, wherein the model is developed in part by training a machine learning algorithm from previous projects and out of office employee situations.

10. A system, comprising:
    one or more processors configured to execute program code that, when executed causes the one or more processors to:
    monitor employee data of one or more employees of an institution; determine a likelihood that an employee is out of office based in part upon the employee data;
    determine a set of projects of the employee that are affected by the out of office, wherein the projects are related to customer services of the institution;
    analyze the set of projects to determine a priority for each project of the set of projects, by:
    developing a model based in part on a historical departure score, text analysis of customer correspondence, and customer attributes;
    determine a departure score for at least one project in the set of projects, the departure score representing a risk a project may leave the institution;
    detect the departure scores of a subset of projects in the set of projects exceeds a threshold departure score;

reassign each of the subset of projects in the set of projects based on the detection, the text analysis, and the priority;

determine, after reassigning the subset of projects, a second departure score based on the model and updated text analysis of customer correspondence;

detect the second departure scores of the subset of projects in the set of projects exceeds a threshold departure score; and reassign the subset of projects in the set of projects based on the detection, the updated text analysis, and the priority.

11. The system of claim 10, wherein determining the employee is out of the office is further based on: comparing the likelihood to an out of office threshold.

12. The system of claim 11, wherein the one or more processors are further configured to:

store the employee data, wherein the employee data includes at least one of employee communications data, calendar entries, time entries, social media, learned employee behavior, contextual data or time off requests.

13. The system of claim 12, wherein the one or more processors are further configured to: apply natural language processing and volume metric analysis to employee communications data of the employee data to determine the likelihood.

14. The system of claim 10, wherein the one or more processors are further configured to: determine the project information, the project information including at least one of customer information, customer communications, stage of the project, customer sentiment, or complaints data.

15. The system of claim 14, wherein the one or more processors are further configured to: model the project information to determine the departure score.

16. The system of claim 10, wherein the one or more processors are further configured to: identify one or more employees that are in office using analyzed employee data; and distribute the one or more projects that are above a priority threshold to the one or more employees in office.

17. The system of claim 10, wherein the one or more processors are further configured to: monitor a customer sentiment of a reassigned project.

18. The system of claim 10, wherein the model is developed in part by training a machine learning algorithm from previous projects and out of office employee situations.

19. A non-transitory computer readable medium having instructions to control one or more processors configured to:

monitor employee data of one or more employees of an institution;

determine a likelihood an employee is out of office based at least in part upon the employee data compare the likelihood to a threshold to determine the employee is out of office;

determine a set of projects of the employee that are affected by the out of office, wherein the projects are related to customer services a customer of the institution;

develop a model based in part on a historical departure score, text analysis of customer correspondence, and customer attributes;

analyze the set of projects according to the model to determine departure scores for each project of the set of projects;

rank each project of the set of projects according to the departure scores;

detect the departure score of a subset of projects in the set of projects exceeds a threshold departure score; and reassign the subset of projects based on the employee data the detection, and the ranking;

determine, after reassigning the subset of projects, a second departure score based on the model and updated text analysis of customer correspondence;

detect the second departure scores of the subset of projects in the set of projects exceeds a threshold departure score;

and reassign the subset of projects in the set of projects based on the detection, the updated text analysis, and the priority.

20. The non-transitory computer readable medium of claim 19, wherein the one or more processors are further configured to reassign each of the set of projects based on a second model that determines an optimal employee for distribution of reassigned projects.

\* \* \* \* \*